Sept. 8, 1931.  F. P. CONNORS  1,822,584
AUTOMATIC EXPANDING BELT PULLEY
Filed July 17, 1929  4 Sheets-Sheet 2

INVENTOR.
Frederick P. Connors
BY
Myron J. Dikeman
ATTORNEY.

Sept. 8, 1931.    F. P. CONNORS    1,822,584
AUTOMATIC EXPANDING BELT PULLEY
Filed July 17, 1929    4 Sheets-Sheet 3

INVENTOR.
Frederick P. Connors
BY
Myron J. Dikeman
ATTORNEY.

Sept. 8, 1931.  F. P. CONNORS  1,822,584
AUTOMATIC EXPANDING BELT PULLEY
Filed July 17, 1929  4 Sheets-Sheet 4
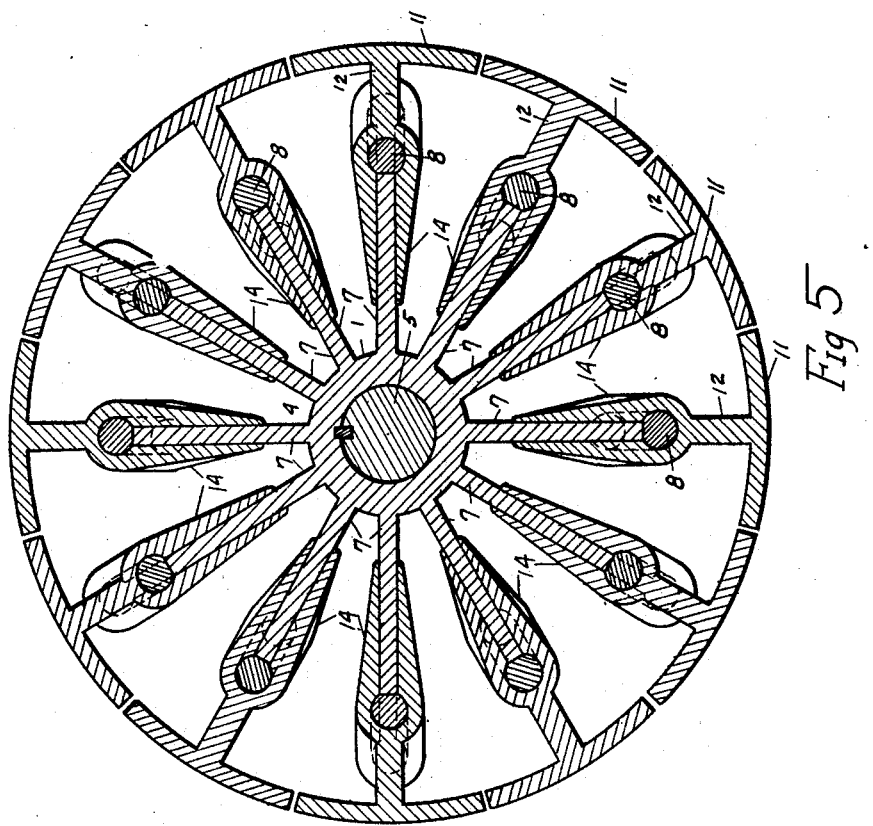
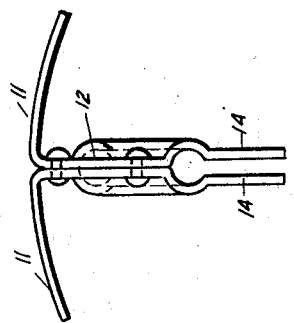
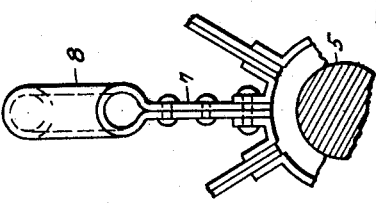
INVENTOR.
Frederick P. Connors
BY
Myron J. Dikeman
ATTORNEY.

Patented Sept. 8, 1931

1,822,584

UNITED STATES PATENT OFFICE

FREDERICK P. CONNORS, OF DETROIT, MICHIGAN

AUTOMATIC EXPANDING BELT PULLEY

Application filed July 17, 1929. Serial No. 378,844.

My invention relates to an adjustable belt pulley and is a modification and improvement of an adjustable belt pulley described in my former patent application Serial No. 375,093 filed July 1st 1929.

The object of my invention is to provide a special belt pulley adapted for changing the pulley diameter while the pulley is in motion.

Another object is to provide mechanical means for changing the ratio of velocities between belt connected pulleys without shifting or loosening the belt section.

A further object is to provide an automatic expanding pulley that may be constructed on a rigid frame, yet capable of changing the pulley diameter at high speed.

A still further object is to so design an expanding belt pulley suitable for constructing from sheet metal by press and die machinery.

The several objects are attained in the preferred form by the construction and arrangement of parts more fully hereinafter set forth.

Similar parts on all drawings are marked by similar numerals.

Fig. 5 is a vertical section taken on the line 5—5 of Fig. 2 showing the segment slides and stiffening members.

Fig. 6 is a detail view of a rim segment when made of pressed sheet metal and is an alternate segment for the ones shown in the assembled drawings.

Fig. 7 is also a detail view of an alternate form of hub spoke and slide when made of pressed sheet metal, and is a substitute for the form shown in the assembled drawings.

Figure 1:
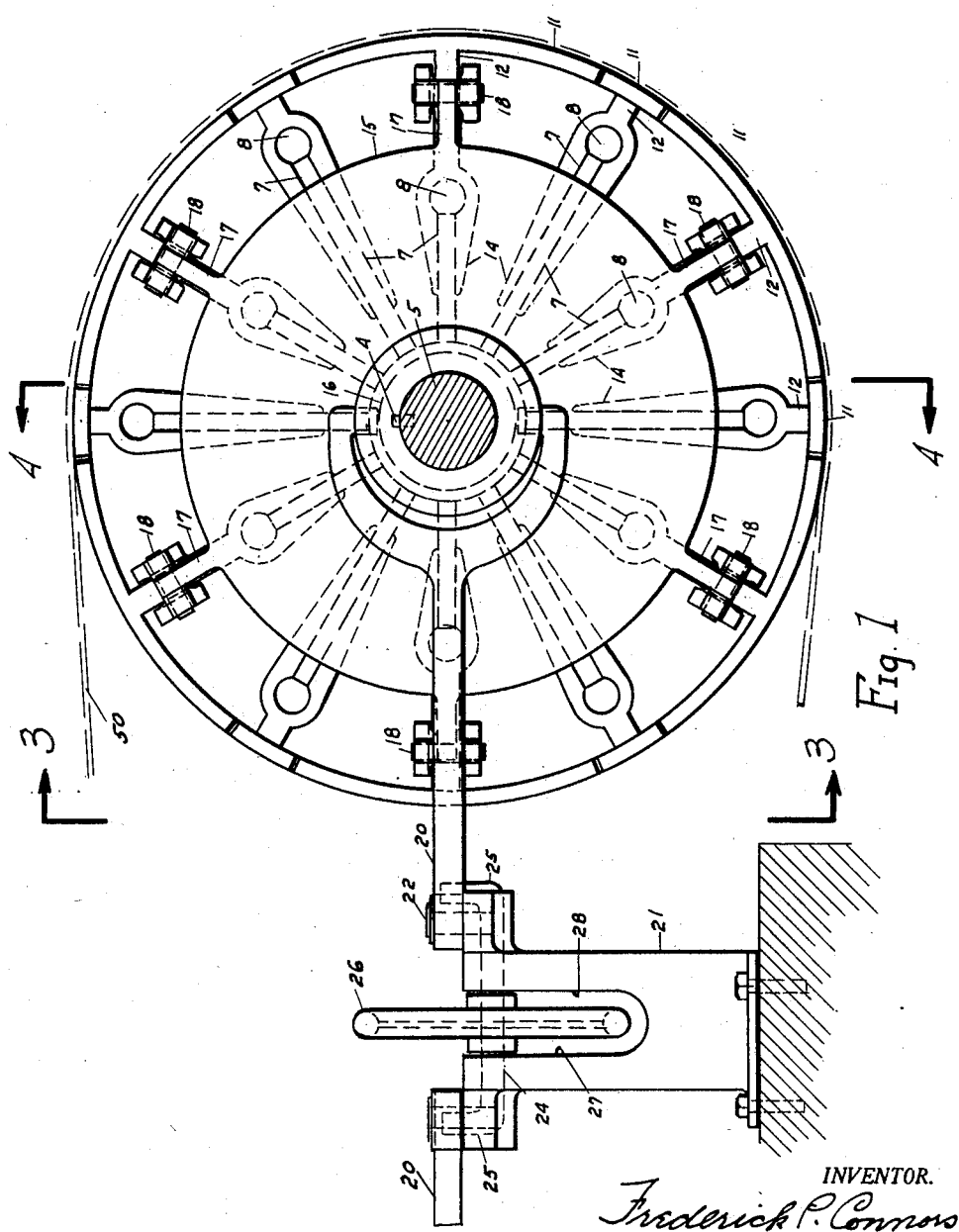
Fig. 1 is a side view of my device showing the exterior of the assembled pulley and the operating clutch operating mechanism.

This automatic pulley, like that shown and described in my former application Serial No. 375,093, above mentioned, is especially adapted for types of machinery requiring means for changing the operating speeds, such as turning lathes, milling machinery, drill presses etc., and which are now more commonly constructed with a series of different diameter stepped pulleys, and changing the speeds by shifting the driving belt from one pulley to another. My device accomplishes the same result without the several pulleys or the shifting of the belt, and the change of speed can be accomplished while the pulleys are in motion. While I have shown and described only a single pulley and clutch shifting mechanism, it is to be understood that these pulleys are to be operated in pairs connected by a flexible belt, and operated by shifting mechanism conected to both pulleys in a manner for adjusting them simultaneously, for decreasing the diameter of one pulley as the pulley diameter of the opposite pulley is increased, and at a predetermined ratio for maintaining a constant tension on the connecting belt section. Ordinarily the sum of the two pulley circumferences will remain a constant length, although in some cases the ratio may be varied to increase or decrease the sum of the pulley circumferences if required when the connecting belts are crossed between the pulleys.

I will now describe more fully the detailed construction of my device, referring to the drawings and the marks thereon.

In general, my device comprises a suitable hub section for fixedly mounting on a pulley shaft, and formed with a series of radially positioned web spokes arranged lengthwise of the hub, the outer edges of the alternate web spokes being sloped at an angle with the hub axis, and the intervening alternate web spokes likewise formed with their outer edges sloped at the same angle with the hub axis but in the opposite direction, forming approximately an interwoven double cone web spokes hub. Mounted on the sloping edges of each of the web spokes is an adjustable rim segment, slidable thereon, and actuated by a connected clutch disc splined to either end of the hub. Each clutch disc being connected to one set of alternate rim segments and capable of adjusting all in unison and moving alternate rim segments in opposite directions along the shaft, the movement of which will either increase or decrease the pulley diameter.

Figure 2:
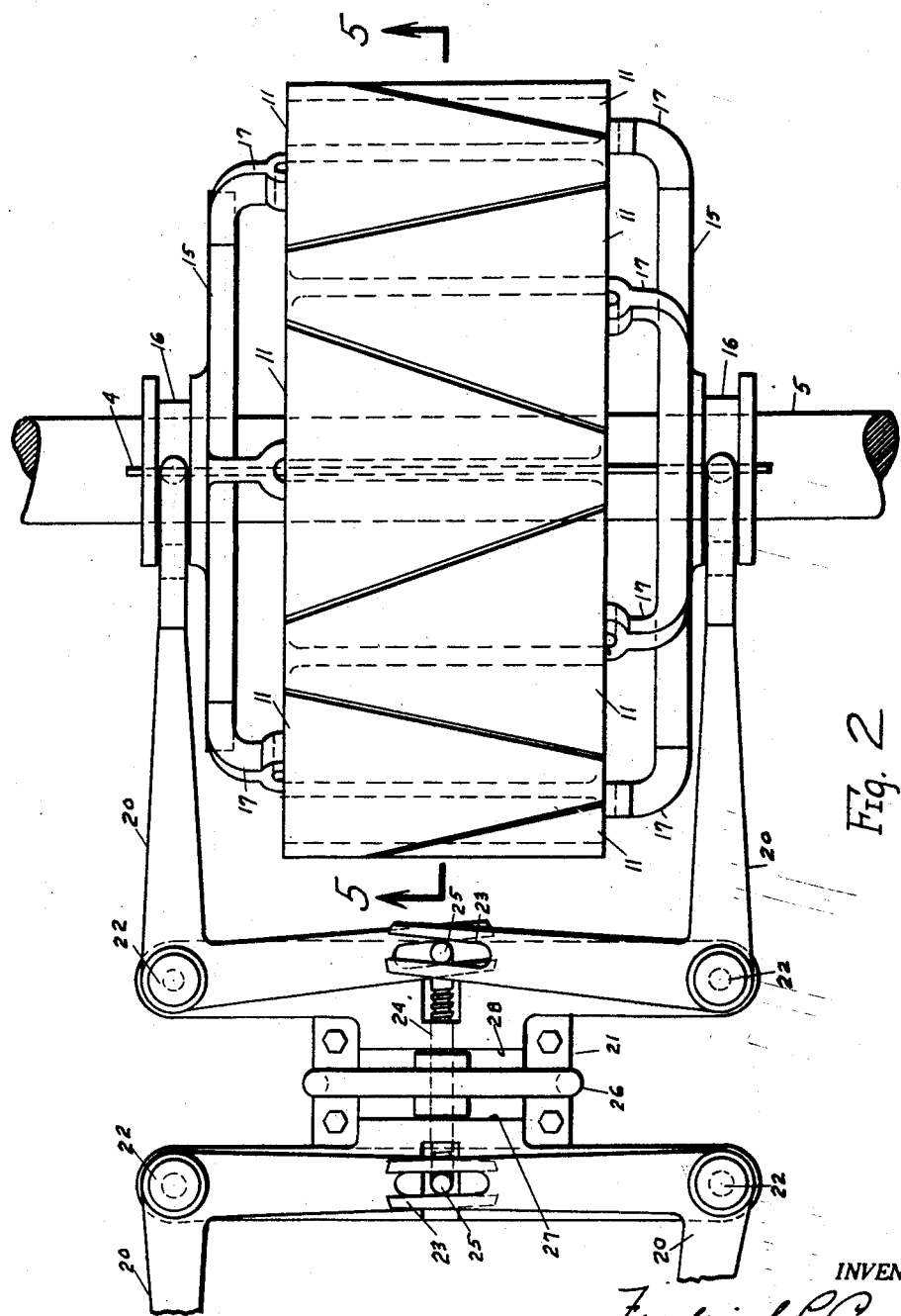
Fig. 2 is a top view of the assembled pulley showing the interwoven V-shaped perimeter segments, and the double clutch operating mechanism.
Figure 4:
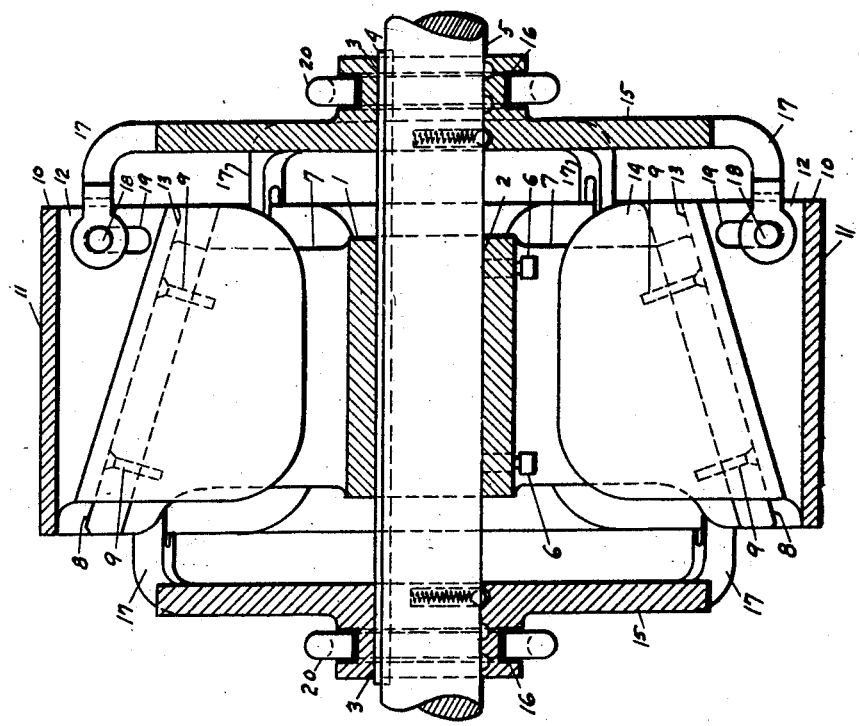
Fig. 4 is a sectional view taken on the line 4—4 of Fig. 1 showing the general arrangement of the operating parts and means for changing the pulley diameter.
Figure 3:
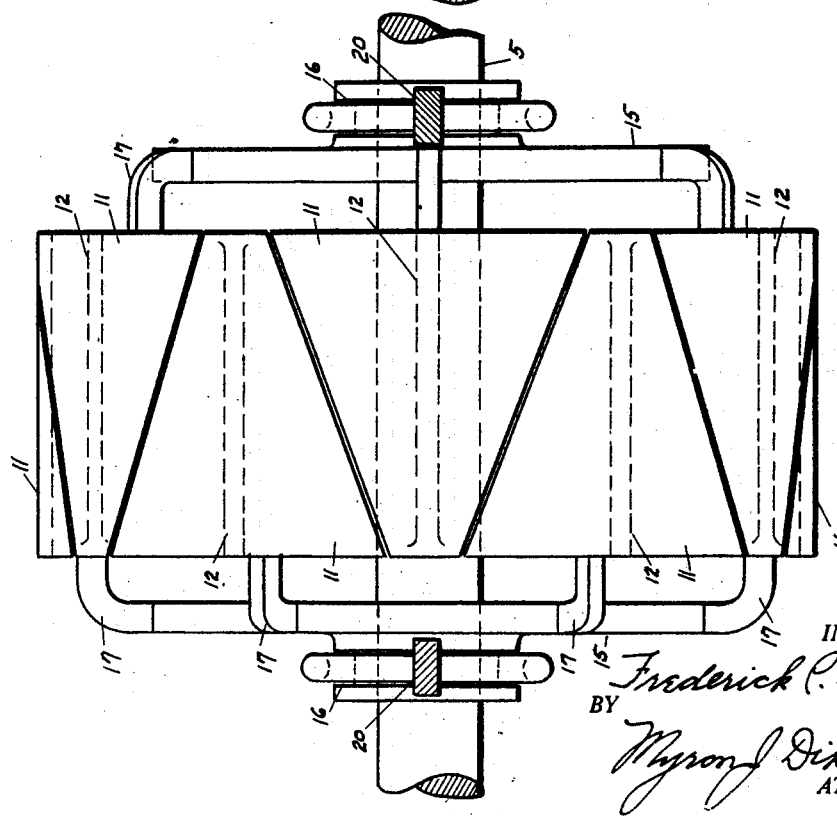
Fig. 3 is a sectional view device taken on the line 3—3 of the Fig. 1 showing the attached clutch members as mounted on the clutch discs.

The hub —1— is preferably cylindrical in form and is provided with a true cylindrical shaft bearing —2— along the hub axis thereof, and may be formed with a key way —3— and key —4— for securely attaching the hub to the shaft —5—, or provided with suitable set screws —6—, or both if desired. The hub —1— is preferably made of case metal, although it may be made of pressed sheet metal if desired, and is preferably formed with a series of uniformly spaced radially positioned web spokes —7— all arranged lengthwise the hub. The outer edges of all alternate web spokes are formed at an angle with the hub axis in one direction, outlining the surface of a cone frustrum, and likewise the outer edges of the intervening alternate web spokes are formed at the same angle with the hub axis but in the opposite direction, also outlining the surface of a cone frustrum pointing in the opposite direction. Each of the sloping web spoke edges are provided with a suitable slide member —8—, preferably formed of a cylindrical rod securely attached to the web spoke edge by suitable bolts —9—, or if desired the slide may be formed as a part of the web spoke section. Any suitable type of slide may be used in place of the roll slide —8— that will provide a strong joint section adjustable along the web spoke edges. Mounted on each of the slide members —8— is a special rim segment —10—, each formed with a V-shaped perimeter —11—, preferably with a cylindrical curved surface having its elements parallel with the hub axis, and is provided with a radially positioned web spoke —12— projecting therefrom along the centerline of the perimeter section. The segment spoke —12— is formed with a recess opening —13— suitable for receiving and retaining the slide —8— therein and is positioned within the segment spoke at the same angle as the slide member for retaining the perimeter curved section parallel to the hub axis. Each rim segment is provided with the side wings —14— overlapping and engaging the sides of the hub web spokes —7—, providing rigidity to the rim segments when utilized as a belt pulley. If desired, both segments and spokes may be made of pressed sheet metal as illustrated in Figs. 6 and 7, although the purpose and operation is the same as described. The angles of the perimeter segment edges must be pre-determined and are governed by the angle of approach formed on the sloping edges of the hub spoke slide —8—, and must be sufficient to increase the pulley perimeter by sliding the perimeter sections together as the pulley diameter is increased by movement of the segments on the hub spoke slides. The V-shaped perimeter segments —11— are positioned alternately in opposite directions and interwoven as indicated in Figs. 1 and 2 of the drawings, the narrow end of the segment being positioned over the hub spoke slide end farthest from the hub axis, with the perimeter section edges adjoining. If desired the perimeter segment edges may be jointed together by groove and tongue joints for causing the segments to move evenly and provide a more even pulley belt surface. Splined to the shaft —5— at each end of the hub —1— are clutch discs —15—, preferably circular discs formed with a central hub and clutch groove —16— therein concentric with the hub axis. While the discs —15— are shown splined to the pulley axis, they may also be splined to extended collar sleeve sections projected out of the hub ends equally as well. The discs —15— are of a diameter smaller than the assembled pulley, and are provided with projecting clevis fingers —17— radially positioned thereon, placed opposite alternate web spokes —12— of the rim segments —10—, and connected to said rim segments at the wider perimeter ends by the pins —18—, and which slide in the web slots —19— of the segments —10—. The respective clutch discs —15— each engaging and operating half of rim segments, each capable of sliding one set of alternate rim segments in opposite directions along the hub axis, thereby increasing or decreasing the pulley diameter as desired. Suitable forked clutch operating levers —20— are pivotally mounted on a rigid operating base bearing —21— by means of the pivot pins —22— and positioned thereon with the forked ends engaging the clutch grooves —16—. The forked operating levers —20— are preferably formed L-shaped having their opposite ends —23— slotted and overlapping each other along the assembled pulley centerline. Within the base bearing —21— is mounted a threaded operating shaft —24— formed with hooked ends —25—, one of said hooked ends being positioned to engage the end slots —23— of the clutch operating levers. An operating wheel —26— formed with a central threaded hub is mounted on the threaded operating shaft —24— and held within the bearing in a fixed lateral position by the bearing walls —27— and —28—, thereby causing a longitudinal movement of the threaded operating shaft —24— when the wheel is rotated, and likewise moving the connected clutch arms —20— and discs —15— in opposite directions, also causing the alternately attached rim segments to be moved in opposite directions accordingly, for changing the pulley diameter. A like set of clutch operating levers —20— are to be attached to the opposite end hook —25— of the operating shaft —24— for engaging the clutch grooves —16— of a similar adjustable pulley with which it is to be operated, for operating these pulleys in pairs, connected by a belt —50—. Any adjustment of the operating wheel —26— will change and adjust both pulley diameters simultaneously, increasing the diameter of one pulley as the other pulley diameter is decreased, and if both pulleys are designed with the proper ratio of the web slide and perimeter angles, and clutch operating levers —20— a constant belt tension may be maintained throughout the various adjustments of the connected pulley diameters.

While I have illustrated my device by one special design, it is apparent that the expanding pulley may be designed with various mechanical modifications, and it is apparent that different types of slides and clutch locking devices, as well as different types of clutch operating mechanism may be employed without departing from my invention, and I claim the device as shown herein and in any modified form that is substantially a substitution of parts and means herein shown.

Having fully described my automatic expanding pulley, what I claim as my invention and desire to secure by Letters Patent is:

1. An adjustable belt pulley adapted for changing the pulley diameter while in motion and used in combination with a pulley shaft, comprising a hub section formed with a suitable bearing for fixedly mounting same on a pulley shaft, said hub being formed with a series of radially positioned hub ribs arranged along the hub walls lengthwise thereof, said ribs having their outer edges sloped alternately in opposite directions with the hub axis, a pulley rim segment slidably mounted on each of said sloping rib edges, a clutch disc splined to the pulley shaft at each end of the pulley, each clutch disc being connected with one set of alternate rim segments, mechanical means attached to each of said clutch discs capable of displacing same on the pulley shaft simultaneously in opposite directions and thereby changing the pulley diameter.

2. An adjustable pulley adapted for changing the pulley diameter while in motion and used in combination with a pulley shaft, comprising a hub section formed with a suitable bearing for fixedly attaching same on a pulley shaft, said hub section being formed with radially positioned longitudinal web spokes having their outer edges sloped at a pre-determined angle with the hub axis, said web spoke edges being sloped alternately in opposite directions to said hub axis, a slide formed along the edge of each of said sloping web spoke edges and parallel thereto, a pulley rim segment mounted on each of the said slides capable of displacement along the supporting web spoke edge, said rim segment being formed with a curved outer perimeter wall positioned concentric with and parallel to the hub axis, a clutch disc mounted at each end of the hub and splined to the pulley shaft section, each of said clutch discs being connected to one set of alternate rim segments in a manner for displacing said alternate segments along their supporting slides in opposite directions, and mechanical means attached to said clutch discs for displacing them simultaneously in opposite directions and thereby changing the positions of the rim segments for varying the pulley diameter.

3. An adjustable belt pulley adapted for changing the pulley diameter and used in combination with a pulley shaft, comprising a suitable hub section having a central bearing for fixedly mounting said hub on a pulley shaft, said hub section being formed with radially positioned longitudinal web spokes having their outer edges sloping alternately in opposite directions with the hub axis, each of said web spoke edges being provided with a fixed slide member positioned parallel to the edge, pulley rim segments slidably mounted on the alternately sloping web spoke slides and movable lengthwise thereof, each rim segment being formed with a V-shaped curved perimeter surface, positioned concentric with and parallel to the hub axis, said rim segments also being formed with radially positioned web spokes, said rim segments being positioned with the V-shaped perimeter sections overlapping and interweaving with each other forming a continuous cylindrical pulley perimeter, an adjusting clutch slidably mounted on each end of the hub and splined thereto, rotatable therewith, each of said adjusting clutches being mechanically connected to one set of alternately placed rim segments capable of displacing them along the supporting web spoke slides, and means mounted on and attached to each of said adjusting discs capable of displacing same simultaneously in opposite directions along the hub axis and thereby displacing the connected alternate rim segments in opposite directions for changing the pulley diameter.

4. An adjustable belt pulley adapted to be used in pairs aligned on parallel pulley shafts and in combination therewith, each pulley comprising a suitable hub section for fixedly mounting same on one of the pulley shafts, said hub being formed with a series of radially positioned longitudinal rib slides sloped alternately in opposite directions with the hub axis, a pulley rim segment slidably mounted on each of said rib slides and movable thereon along the slide, each of the said rim segments being formed with a V-shaped curved outer perimeter surface concentric with and parallel to the hub axis, an adjusting clutch slidably mounted on each end of the hub rotatable therewith, each clutch being connected to one set of alternate rim segments capable of displacing same along their supporting slides, clutch operating means mounted between the pairs of pulleys and connected to each of the adjusting clutches capable of displacing said clutches of each pulley, simultaneously in opposite directions along their respective hub axis, and also two simultaneous sets of pulley clutches in opposite directions in a manner to increase the diameter of one pulley as the pulley diameter of the other pulley is decreased.

In witness whereof I sign these specifications.

FREDERICK P. CONNORS.